United States Patent
Coffield

[11] Patent Number: 5,127,233
[45] Date of Patent: Jul. 7, 1992

[54] HUMIDITY CONTROL SYSTEM FOR A CONTROLLED ATMOSPHERE CONTAINER

[75] Inventor: Kelly Coffield, Davenport, Iowa

[73] Assignee: Litton Systems, Inc., Davenport, Iowa

[21] Appl. No.: 620,791

[22] Filed: Dec. 3, 1990

[51] Int. Cl.⁵ .................... F24F 3/12; B01D 53/04
[52] U.S. Cl. ................................ 62/78; 55/68; 55/23; 426/418; 426/419; 62/92; 62/93
[58] Field of Search ................ 62/78, 92, 93; 55/68, 55/23; 426/419, 418

[56] References Cited

U.S. PATENT DOCUMENTS

| | | | |
|---|---|---|---|
| 2,528,982 | 11/1950 | Touton | 236/44 B |
| 4,253,315 | 3/1981 | Fiedler | 62/93 |
| 4,829,774 | 5/1989 | Wassibauer et al. | 62/78 |

Primary Examiner—Albert W. Davis, Jr.
Attorney, Agent, or Firm—Brian L. Ribando

[57] ABSTRACT

Moisture is removed from the compressed feed air to a separator and collected in liquid form in a reservoir. The humidity in a controlled atmosphere container is monitored and moisture is taken from the reservoir and added to the container in order to provide an ideal environment for the preservation of foodstuffs.

5 Claims, 2 Drawing Sheets

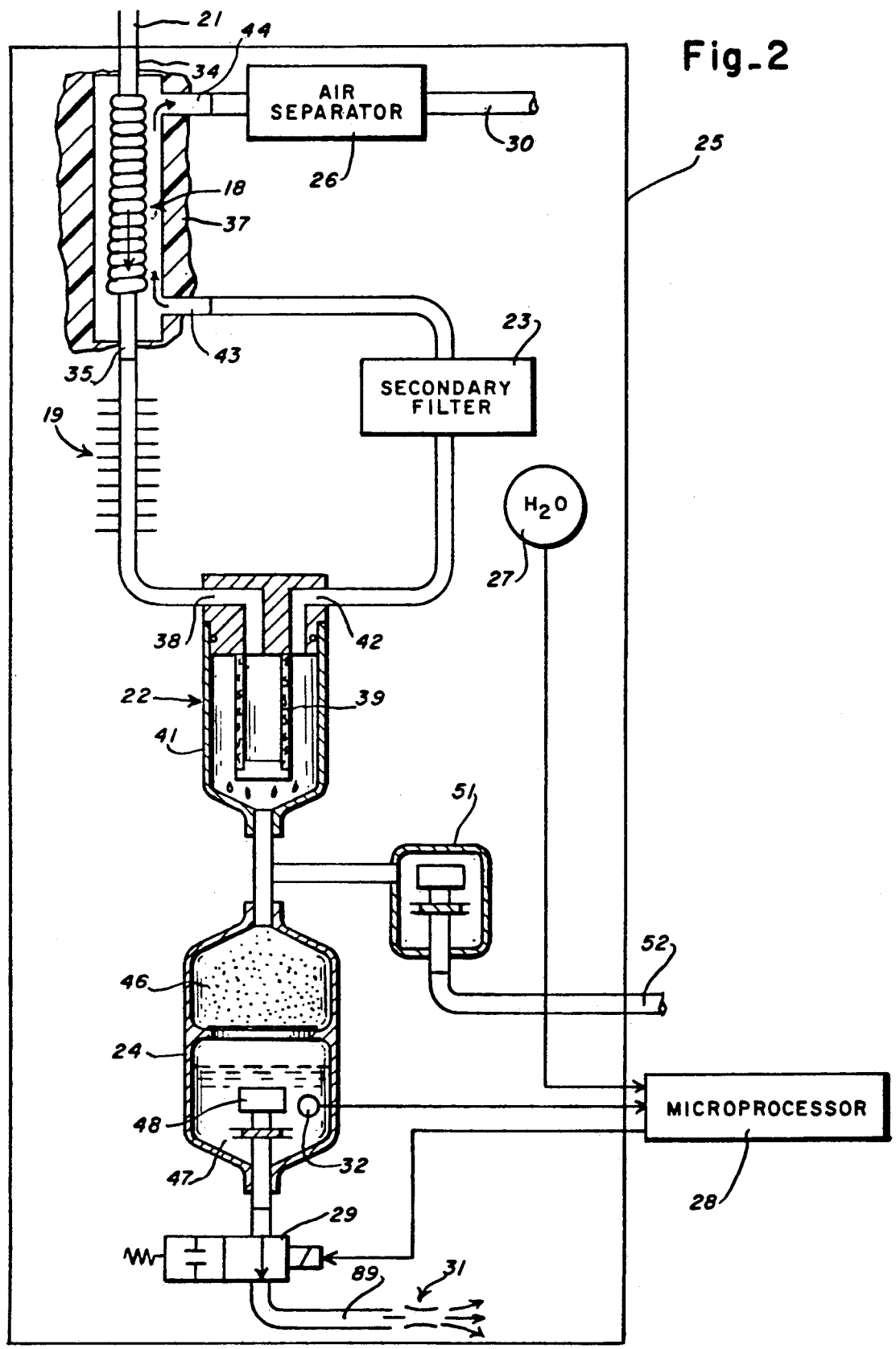
Fig_2

5,127,233

HUMIDITY CONTROL SYSTEM FOR A CONTROLLED ATMOSPHERE CONTAINER

BACKGROUND OF THE INVENTION

The invention relates to a humidity control system for a controlled atmosphere ("CA") container which uses moisture condensed from the feed air to an air separator to increase the humidity level in the CA container.

CA containers for the post-harvest processing, transporting, and storage of agricultural commodities are known in the art. The use of such containers is well established for the storage and transport of certain products such as apples and is growing for others. CA containers provide a longer shelf life than non-regulated containers for fruits and vegetables and result in optimum freshness at the place of ultimate destination.

Typically, CA containers utilize an air separation unit to remove oxygen and other naturally occurring gases from ambient air to produce a supply of gas having a nitrogen concentration of up to 99.5 percent. Precise amounts of $O_2$ and $CO_2$ are added to the nitrogen atmosphere in the CA container to create ideal storage conditions for the foodstuffs contained therein. A separate refrigeration unit cools the interior of the CA container to the desired temperature.

Often the CA container is a mobile unit which is hauled by truck cab, rail, or ship from the place of harvest to the ultimate destination. During this time, the air separation unit continually supplies nitrogen to the interior of the CA container in order to displace naturally occurring atmospheric gases and other gases which are given off by the foodstuffs during the ripening process and to replace nitrogen which escapes through leakage from the container itself. The air separator may use either pressure swing adsorption or hollow membrane technology in order to effect the necessary separation of nitrogen from the oxygen, carbon dioxide, and other constituents of atmospheric gas.

Feed air to the separator is dehumidified in order to increase the efficiency of the separator and product gas is typically dehydrated to a very dry condition as a result of the separation process itself. In the case of the controlled atmosphere storage of foods, relatively high humidity is usually desired and the humidity level should be kept within a narrow range. However, the availability of water and the space to store it in mobile units is minimal.

There is, accordingly, a need in the art for an air management system for a CA container in which the product gas in a CA container is humidified in order to provide optimum storage conditions in the container.

SUMMARY AND OBJECTS OF THE INVENTION

According to the invention, the humidity of product gas in a CA container is controlled to optimum values.

Since the separator may dry the product gas to a degree which is less than satisfactory for use in the CA container, water is atomized and added to the container as necessary to maintain the desired humidity level. The water used is reclaimed from condensate derived from the compressed feed air which supplies the input of the separator unit.

It is accordingly an object of the invention to provide a humidity controller for a CA system in which dry air from a separation unit is humidified using condensate reclaimed from the compressed air line.

It is another object of the invention to provide an apparatus for cooling compressed air in order to derive the maximum amount of condensate therefrom to be used in humidifying the interior of a CA container.

These and other objects of the invention will be apparent from the following detailed description in which references numerals used throughout the description correspond to reference numerals used on the drawing figures.

BRIEF DESCRIPTION OF THE DRAWINGS

FIG. 2 shows a humidity controller used in a CA system of FIG. 1.

DESCRIPTION OF THE PREFERRED EMBODIMENT

Figure 1:
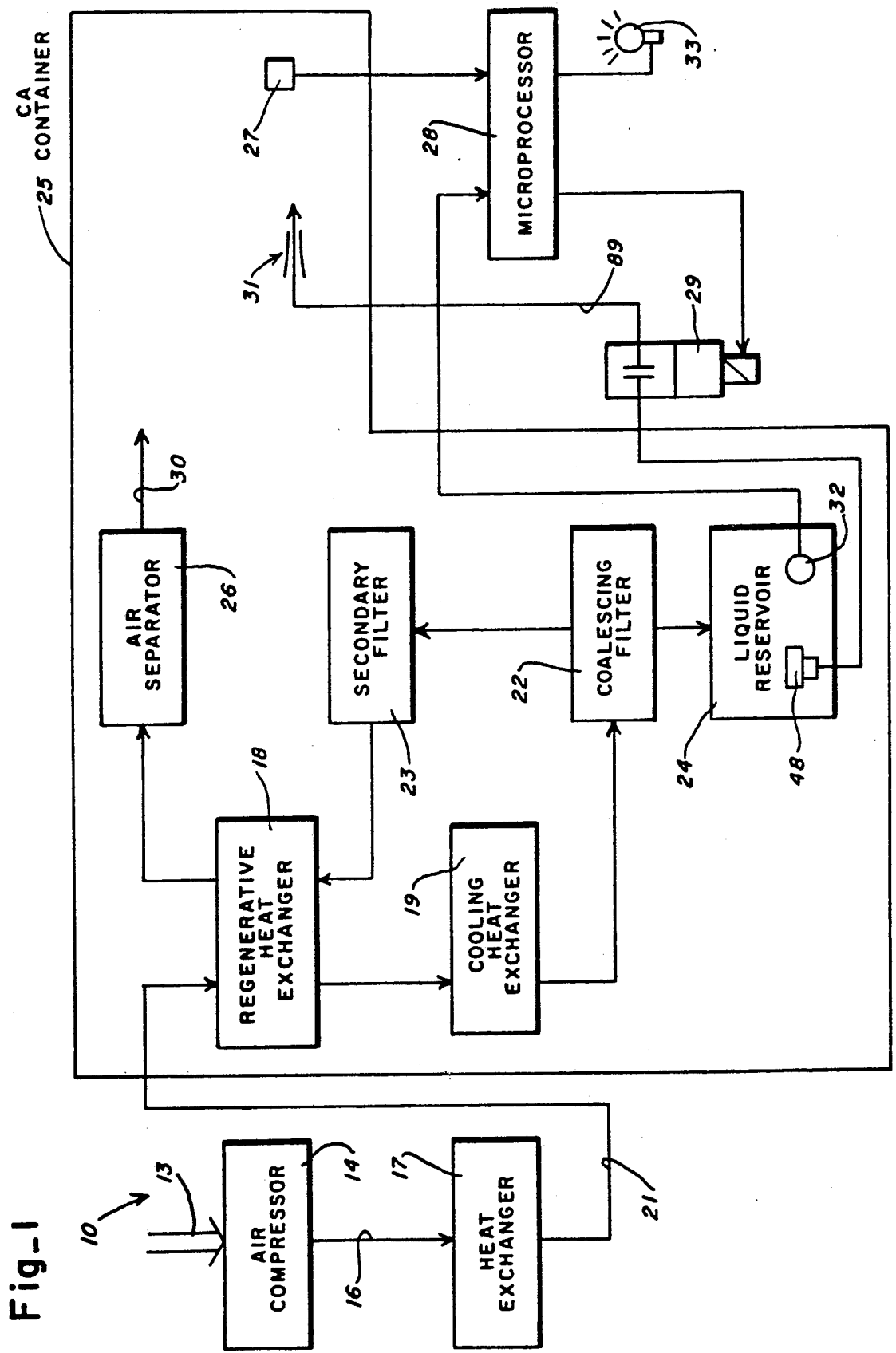
FIG. 1 is a schematic drawing showing the elements of the CA system according to the invention.

FIG. 1 shows a CA installation generally indicated by the reference numeral 10. Ambient air enters the inlet 13 of an air compressor 14. The compressor 14 pressurizes the air to 100-125 psig and delivers the same by means of an outlet line 16 to a heat exchanger 17 which may be mounted directly on one end of the compressor 14. The heat exchanger 17 provides an initial cooling of the compressed gas stream which may be 350° F. entering the heat exchanger 17 and 130° F. exiting. Since the heat exchanger 17 is located outside of the CA container 25, the removed heat does not add to the heat load on the inside of the CA container.

Partially cooled compressed air is carried by a pressure line 21 to a regenerative heat exchanger 18 and a cooling heat exchanger 19 to remove additional heat, then to a coalescing filter 22 to remove moisture, and to a secondary filter 23 for further purification. Water from the coalescing filter 22 collects in a reservoir 24. The dried and filtered air is routed back through the regenerative heat exchanger to be reheated before delivery to an air separator 26 which may use any of the known air separation technologies such as molecular sieve but a hollow fiber membrane separator is preferred. Product gas from the separator 26 is disbursed by a supply line 30 in the CA container 25.

The CA container 25 includes a humidity sensor 27 which is coupled to a microprocessor 28. The microprocessor 28 compares the relative humidity in the CA container 25 with the desired relative humidity level which has been programmed into the microprocessor. Since air from the separator 26 normally has less moisture than required for a CA environment, water may be drawn from the reservoir 24 by a solenoid valve 29 which is controlled by the microprocessor 28 and delivered to an atomizer 31 in the CA container 25. A liquid level sensor 32 in the reservoir 24 is monitored by the microprocessor 28; and in the event the reservoir 24 is empty, a warning lamp 33 is illuminated, and the solenoid valve 29 remains closed.

The water collection and humidity control system is shown in detail in FIG. 2. Compressed air from the heat exchanger 17 enters the CA container 25 where it is coupled to the hot air inlet 34 of the counterflow regenerative heat exchanger 18. The regenerative heat exchanger 18 is surrounded by insulation 37 to retain heat and the cold air outlet 35 is coupled to the cooling heat exchanger 19 which is finned to take advantage of the ambient temperature which exists in the CA container 25. The interior of the CA container is normally maintained at about 35° F. by a separate refrigeration unit (not shown) which forms no part of the present invention. The outlet of the cooling heat exchanger is coupled to the inlet 38 of the coalescing filter 22 which comprises a filter element 39 contained within a housing 41. The outlet 2 of the coalescing filter 22 is coupled to the secondary filter 23 which in turn is coupled to the cold air inlet 43 of the regenerative heat exchanger 18. The hot air outlet 44 of the heat exchanger 18 is coupled to the air separator 26 which has an outlet 30 to distribute product gas to the interior of the CA container 25.

Water which is removed from the compressed air stream by the filter element 39 is routed to the liquid reservoir 24 where it passes through a filter medium 46 such as activated carbon and collects in the lower portion 47 of the reservoir 24.

The reservoir 24 contains the liquid level sensor 32 the output of which is coupled to the microprocessor 28, and a buoyant valve 48 which acts as a redundant liquid level sensor. Water is drawn from the reservoir 24 through the buoyant valve 48 by means of the solenoid valve 29 which is controlled by the microprocessor 28 and delivers water through the line 89 to an atomizer 31 in the CA container 25. An overflow valve 51 between the coalescing filter 22 and the fluid reservoir 24 dumps excess water from the reservoir 24 to an overflow vent 52 and prevents the unintended introduction of water into the CA container 25.

In operation, the humidity control circuit satisfies conflicting system requirements of delivering dry air to the separator 26 for efficient operation and maintaining high humidity in the CA container 25 to provide optimum food storage conditions. To achieve this result, the amount of water which is removed from the compressed air stream and available for humidification is maximized by cooling the air in the regenerative heat exchanger 18 and the cooling heat exchanger 19 before passing the air stream through the coalescing filter element 39. The two heat exchangers 18 and 19 lower the temperature of the compressed air stream from 130° F. to 35° F. Heat which is removed from the air stream in the regenerative heat exchanger 18 can be efficiently stored due to the insulation 37 and given back to the air stream which enters the cold air inlet 43. The air delivered at the hot air outlet 44 will be approximately 120° F. which allows the air separator 26 to operate more efficiently than would be possible with an air supply at 35° F. The microprocessor monitors the humidity level in the CA container 25 by means of the sensor 27 and adds moisture to the container by means of the atomizer 31 which draws water from the reservoir 24. The liquid level sensor 32 and the buoyant valve 48 insure that water is present in the reservoir 24 when the solenoid valve 29 is open to prevent the delivery of air by the atomizer which would upset the balance of air and nitrogen in the CA container.

Having thus described the invention, various alterations and modifications will be apparent to those skilled in the art, which modifications and alterations are intended to be within the scope of the invention as defined by the appended claims.

What is claimed is:

1. A system having a source of compressed air for providing a controlled atmosphere to a container using an air separator and a rehumidifier comprising:

filter means for removing moisture from compressed air;
a reservoir for storing the removed moisture in liquid form;
means for using the liquid in the reservoir to increase the humidity in the container;
a humidity sensor in the container;
an atomizer in the container for atomizing liquid drawn from the reservoir;
a valve for delivering liquid from the reservoir to the atomizer;
means for controlling said valve in accordance with the humidity level in the container as sensed by the humidity sensor;
a liquid level sensor in the reservoir coupled to the means for controlling; and
an overflow valve between the filter means and the reservoir to dump excess water from the reservoir.

2. A system having a source of compressed air for providing a controlled atmosphere to a container using an air separator and a rehumidifier comprising:

means for cooling the compressed air stream;
filter means for removing moisture from the cooled compressed air stream;
a reservoir for storing the removed moisture;
means for using the moisture in the reservoir to increase the humidity in the container;
a regenerative heat exchanger comprising the means for cooling, wherein the gas stream is cooled before delivery to the filter means and the gas steam is heated before delivery to the separator; and
a cooling heat exchanger exposed to the ambient temperature in the container, wherein the cooling heat exchanger further cools the compressed air stream from the regenerative heat exchanger before delivery to the filter means.

3. A system having a source of compressed air for providing a controlled atmosphere to a container using an air separator and a rehumidifier comprising:

means for cooling the compressed air stream;
filter means for removing moisture from the cooled compressed air stream;
a reservoir for storing the removed moisture;
means for using the moisture in the reservoir to increase the humidity in the container;
a regenerative heat exchanger comprising the means for cooling, wherein the gas stream is cooled before delivery to the filter means and the gas stream is heated before delivery to the separator;
means for sensing the presence of liquid in the reservoir; and
means for preventing the introduction of the contents of the reservoir to the interior of the container when there is no liquid in the reservoir.

4. The system of claim 3 further comprising:
a liquid level sensor and a buoyant valve in the reservoir comprising the means for preventing.

5. A system having a source of compressed air for providing a controlled atmosphere to a container using an air separator and a rehumidifier comprising:

means for cooling the compressed air stream;
filter means for removing moisture from the cooled compressed air stream;
a reservoir for storing the removed moisture;
means for using the moisture in the reservoir to increase the humidity in the container; and
overflow means for venting excess moisture from the reservoir.

* * * * *